United States Patent
Wang et al.

(10) Patent No.: US 10,474,568 B2
(45) Date of Patent: Nov. 12, 2019

(54) RE-PLAYABLE EXECUTION OPTIMIZED FOR PAGE SHARING IN A MANAGED RUNTIME ENVIRONMENT

(71) Applicant: Huawei Technologies Co., Ltd., Shenzhen (CN)

(72) Inventors: Kai-Ting Amy Wang, Toronto (CA); Man Pok Ho, Richmond Hill (CA); Peng Wu, Pittsford, NY (US); Haichuan Wang, San Jose, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 66 days.

(21) Appl. No.: 15/710,678

(22) Filed: Sep. 20, 2017

(65) Prior Publication Data

US 2019/0087321 A1  Mar. 21, 2019

(51) Int. Cl.
*G06F 12/0873* (2016.01)
*G06F 12/02* (2006.01)
*G06F 9/455* (2018.01)
*G06F 12/1009* (2016.01)

(52) U.S. Cl.
CPC ...... *G06F 12/0238* (2013.01); *G06F 9/45516* (2013.01); *G06F 12/0873* (2013.01); *G06F 12/1009* (2013.01); *G06F 2212/65* (2013.01)

(58) Field of Classification Search
CPC .................................................. G06F 12/0873
USPC ......................................................... 711/102
See application file for complete search history.

(56) References Cited

U.S. PATENT DOCUMENTS

| 2006/0101446 A1* | 5/2006 | Mariani | G06F 9/44563 717/166 |
| 2007/0283336 A1* | 12/2007 | Gschwind | G06F 9/45516 717/148 |
| 2012/0304166 A1* | 11/2012 | Gu | G06F 9/4401 717/174 |

(Continued)

FOREIGN PATENT DOCUMENTS

| CN | 104881330 A | 9/2015 |
| CN | 106161110 A | 11/2016 |

OTHER PUBLICATIONS

Kawachiya, Kiyokuni, et al., "Cloneable JVM: A New Approach to Start Isolated Java Applications Faster," IBM Research, Tokyo Research Laboratory, Jun. 13-15, 2007, pp. 1-11.

*Primary Examiner* — Gautam Sain
(74) *Attorney, Agent, or Firm* — Slater Matsil, LLP

(57) ABSTRACT

Embodiments of this disclosure allow non-position-independent-code to be shared between a closed application and a subsequent application without converting the non-position-independent-code into position-independent-code. In particular, embodiment techniques store live data of a closed application during runtime of the closed application, and thereafter page a portion of the live data that is common to both the closed application and a subsequent application back into volatile memory at the same virtual memory address in which the portion of live data was stored during runtime of the closed application so that the paged lived data may be re-used to execute the subsequent application in the managed runtime environment. Because the paged live data is stored at the same virtual memory address during the runtimes of both applications, non-position-independent-code can be shared between the applications.

32 Claims, 5 Drawing Sheets

(56) References Cited

U.S. PATENT DOCUMENTS

2014/0049548 A1* 2/2014 Rao .................. G06F 12/00
  345/502
2014/0281115 A1* 9/2014 Biswal .............. G06F 12/084
  711/3
2017/0357592 A1* 12/2017 Tarasuk-Levin .... G06F 12/1009

* cited by examiner

RE-PLAYABLE EXECUTION OPTIMIZED FOR PAGE SHARING IN A MANAGED RUNTIME ENVIRONMENT

TECHNICAL FIELD

The present disclosure relates generally to cloud computing, and, in particular embodiments, to systems and methods for re-playable execution optimized for page sharing in a managed runtime environment.

BACKGROUND

Software applications (hereinafter "applications") generally consist of source code (e.g., a set of human-readable programming instructions) that is capable of being compiled into machine code (e.g., binary machine code) and executed by an operating system. The source code may be either managed or unmanaged source code depending on which programming language is used to create the application. Unmanaged source code is compiled directly into machine code prior to runtime, and stored in a file for subsequent execution by the operating system. Because unmanaged source code is compiled into machine code prior to runtime, it must generally include operations for managing resources (e.g. memory) of the operation system during execution of the application.

In contrast, managed source code is compiled during runtime of the application by a managed runtime environment (MRTE), which is a type of virtual machine that is installed in the operating system for the purpose of running a managed application. In particular, applications that include managed source code, hereinafter referred to as "managed runtime applications", such as java applications are first compiled into bytecode, which is executed by the MRTE. During execution, the bytecode is interpreted by an interpreter of the MRTE and the frequently interpreted path is then converted into native instructions by a just-in-time (JIT) compiler of the MRTE. The resulting native instructions can then be executed directly on the machine.

Notably, the MRTE manages resources (e.g., memory) of the operating system when interpreting the bytecode during runtime. As a result, managed runtime applications are generally not required to include system-specific instructions for managing operating system resources, which makes it easier for developers to develop applications that are universally compliant across different operating systems on different hardware. However, executing managed runtime applications in the MRTE can be both memory intensive and time consuming. As such, techniques for reducing the memory and time required to execute managed runtime applications in the MRTE are desired.

SUMMARY

Technical advantages are generally achieved by embodiments of this disclosure which describe systems and methods for re-playable execution optimized for page sharing in a managed runtime environment.

In accordance with an embodiment, a method for sharing pages in a managed runtime environment is provided. In this embodiment, the method includes generating live data corresponding to a first application when running the first application in a managed runtime environment on an operating system, and storing the live data corresponding to the first application in non-volatile memory. The first application is closed after storing the live data in the non-volatile memory and prior to runtime of a second application. The method further includes paging a first portion of the live data that is common to both a current working data set of the first application and a current working data set of the second application from the non-volatile memory into volatile memory, and executing the second application using the first portion of the live data as the current working data set of the second application in the managed runtime environment. In one example, paging the first portion of live data includes paging the first portion of live data at a first virtual memory address, where the first virtual memory address is the same virtual memory address in which the first portion of live data was stored during runtime of the first application. In that example, or in another example, the first portion of live data that may be paged into the volatile memory includes native instructions common to both the first application and the second application. In such an example, the native instructions may include just-in-time compiled (JIT-compiled) code generated by a just-in-time compiler in the managed runtime environment, position-independent-code that is not required to be mapped to a specific virtual memory address, and/or non-position-independent-code that is required to be mapped to a specific virtual memory address. Additionally, in such an example, executing the second application using the first portion of the live data as the current working data set of the second application in the managed runtime environment may include reusing the paged native instructions to execute the second application. Additionally, in such an example, fewer than all native instructions of the first application may be paged from the non-volatile memory to the volatile memory. In any one of the above-mentioned examples, or in another example, generating the live data may include running the first application with simulated user inputs to train the managed runtime environment such that the live data is generated. In any one of the above-mentioned examples, or in another example, executing the second application using the first portion of the live data as the current working data set of the second application in the managed runtime environment may include restoring the second application according to at least the first portion of live data corresponding to the first application.

In any one of the above-mentioned examples, or in another example, at least some environment variables that are used to restore the second application may be different than at least some of the environment variables that were used to run the first application such that the second application behaves differently than the first application.

In any one of the above-mentioned examples, or in another example, the first portion of live data that may be paged into the volatile memory includes just-in-time compiled machine instructions associated with the first application. In any one of the above-mentioned examples, or in another example, executing the second application using the first portion of the live data as the current working data set of the second application in the managed runtime environment may include reusing the paged just-in-time compiled machine instructions to execute the second application. In any one of the above-mentioned examples, or in another example, paging the first portion of live data from the non-volatile memory into volatile memory may include paging the first portion of live data and a second portion of the live data from the non-volatile memory to a volatile memory in an on-demand fashion such that the first portion of live data is paged into the volatile memory prior to the second portion of live data, where the first portion of live data being used prior to the second portion of live data during runtime of the second application. In such an example, paging the first portion of live data may include paging the first portion of live data at a first virtual memory address, the first virtual memory address being the same virtual memory address in which the first portion of live data was stored during runtime of the first application. In any one of the above-mentioned examples, or in another example, the first portion of live data that may be paged into the volatile memory includes class metadata of the first application. In such an example, the class metadata may include includes at least one of a class descriptor, method, constant pool, task table or any data structure describing classes in memory maintained by JVM during program execution. In such an example, executing the second application using the first portion of the live data as the current working data set of the second application in the managed runtime environment may include reusing the paged class metadata of the first application to execute the second application. Less than all of the class metadata of the first application may be paged from the non-volatile memory to the volatile memory. In any one of the above-mentioned examples, or in another example, the first portion of live data that is paged into the volatile memory may include data associated with at least one of a virtual machine work-area of the first application, a JIT compiler work-area of the first application, a malloc-then-freed area of the first application, a management overhead area of the first application, a stack area of the first application, and a Java heap area of the first application.

In such an example, executing the second application using the first portion of the live data as the current working data set of the second application in the managed runtime environment may include reusing the paged data associated with the virtual machine work-area to execute the second application, reusing the paged data associated with the Java heap area to execute the second application, reusing the paged data associated with the stack area to execute the second application, and/or reusing the paged data associated with the JIT compiler work-area to compile bytecode of the second application.

In any one of the above-mentioned examples, or in another example, the first portion of live data may include a first page that is available to both the second application and a third application at the first virtual memory address, and the method may further include executing the third application using the first page as the current working data set of the third application in the managed runtime environment. In such an example, executing the second application using the first portion of the live data as the current working data set of the second application in the managed runtime environment may include modifying content of the first page in the volatile memory during execution of the second application according to a copy on write (COW) operation during runtime of the third application, where modifying the content of the first page according to the COW operation may include provisioning a second physical memory location in the volatile memory, and storing the modified content as a second page in the second physical memory location of the volatile memory. The original content of the first page remaining may be stored as the first page at the first physical memory location of the volatile memory such that the original content of the first page remains available for executing the third application in the managed runtime environment. In such an example, the first page of live data may include native instructions common to both the second application and the third application. Additionally, at least some of the native instructions may be non-position-independent-code that is required to be mapped to a specific virtual memory address.

In any one of the above-mentioned examples, or in another example, the first portion of live data that is paged into the volatile memory may include at least a first page that is stored in a physical memory location of the volatile memory, where the first page stored in the physical memory location is available to both the second application and a third application. In such an example, executing the second application using the first portion of the live data as the current working data set of the second application in the managed runtime environment may include re-using at least the first page stored in the physical memory location of the volatile memory to execute at least the second application and the third application in the managed runtime environment, with the first page being common to each of the first application, the second application, and the third application. In such an example, the second application and the third application may be restored inside different non-privileged containers, and the first page may be shared across the respective non-privileged containers. An apparatus, as well as a computer program product, for performing any one of the above-described examples is also provided.

BRIEF DESCRIPTION OF THE DRAWINGS

For a more complete understanding of the present disclosure, and the advantages thereof, reference is now made to the following description taken in conjunction with the accompanying drawings, in which.

DETAILED DESCRIPTION OF ILLUSTRATIVE EMBODIMENTS

Figure 1:
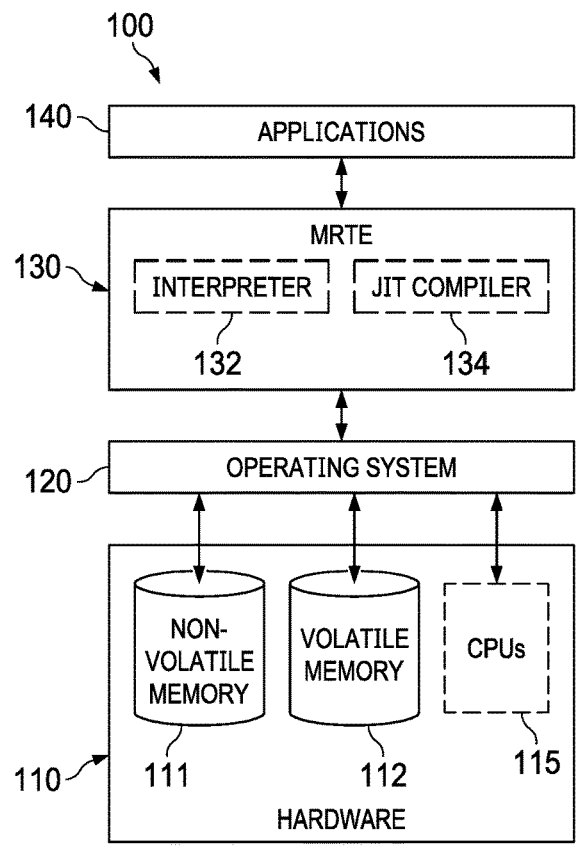
FIG. 1 is a diagram of a processing system for processing applications.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

The amount of live data that must be generated during runtime of an application is closely correlated with the processing load associated with running the application as well as the nature, or the type of applications. As used herein, the term "live data" refers to any data that is generated during runtime of an application, including native instructions, bytecode, and class metadata, as well as data that is stored in, or otherwise associated with, a virtual machine work-area of the application, a compiler work-area of the application, a malloc-then-freed area of the application, management overhead area of the application, a stack area of the application, and/or a Java heap area of the application. Conventional MRTEs generally drop live data from volatile memory when the underlying application is closed in order to free up volatile memory resources. However, in many instances, there is significant overlap between the live data of different applications, meaning that much of the live data for one application is common to another application. As a result, when one of the applications is closed prior to a subsequent application being opened, live data that is common to both the closed application and the subsequent application must be regenerated during runtime of the subsequent application. As used herein, the terms "closed application" and "subsequent application" are used relatively with respect to one another to convey that runtime of the closed application is terminated prior to runtime of the subsequent application being initiated.

Numerous industrial and academic efforts have been made to reduce the memory footprint by promoting page sharing across multiple managed runtime applications. One example is JIT code sharing, which has been adopted by IBM's J9 Java Virtual Machine program as well as Oracle's Java Development Kit (JDK) program. Conventional JIT code sharing techniques are generally only capable of sharing position-independent-code, which is code that does not require absolute virtual memory addressing. Thus, in order to share non-position-independent-code, the MRTE must first transform absolute virtual memory addresses of the non-position-independent-code into relocatable virtual memory addresses, thereby effectively converting the non-position-independent-code into position-independent-code. Because this is not always possible, many types of non-position-independent-code are incapable of being shared by conventional JIT code sharing techniques. Moreover, converting non-position-independent-code into position-independent-code significantly increases runtime overhead, because it introduces an intermediate reference step to account for the offset between the absolute virtual memory address and the relocatable virtual memory address when handling a given page of data. Ultimately, a very small portion of live data qualifies as, or can easily be converted into, position-independent-code, and as a result, conventional JIT code sharing techniques are quite limited.

Embodiments of this disclosure allow non-position-independent-code to be shared between a closed application and a subsequent application without converting the non-position-independent-code into position-independent-code. In particular, embodiment live data sharing techniques store live data of a closed application during runtime of the closed application, and thereafter page a portion of the live data that is common to both the closed application and a subsequent application back into volatile memory that the paged live data may be re-used to execute (e.g., launch, load, interpret, compile, run, etc.) the subsequent application in the managed runtime environment. The paged portion of live data may be common to both a current working data set of the closed application and a current working data set of the subsequent application. As used herein, the term "current working data set" refers to the set of data needed by an application to perform the current phase of its operation.

In some embodiments, the portion of live data is paged into the same virtual memory address during runtime of the subsequent application in which the portion of live data was stored during runtime of the closed application. As referred to herein, data is deemed to be "stored at a virtual memory address" in volatile memory when the data is stored in a physical memory location of the volatile memory that is mapped to, or otherwise associated with, the virtual memory address by a given application. Moreover, it should be appreciated that the term "virtual memory address" is used loosely to refer to one or more specific virtual memory addresses. By extension, paging a portion of live data into volatile memory at a virtual memory address would cover a scenario in which a single page of live data was stored at a single virtual memory address as well as a scenario in which multiple pages of live data are stored at different respective contiguous or non-contiguous virtual memory addresses. Because the paged live data is stored at the same virtual memory address during the runtimes of both applications, non-position-independent-code can be shared without having to transform corresponding absolute addressing references of the non-position-independent-code into relocatable addresses. In this way, embodiment live data sharing techniques significantly increase the amount of live data that is capable of being shared between applications, as well as mitigates the software engineering effort associated with converting non-position-independent-data into position independent data. Further, position-independent-code has more runtime overhead than non-position-independent-code due to the one extra step required to compensate for the offset between the absolute virtual memory address and the relocatable virtual memory address, and consequently, embodiments of this disclosure mitigate the additional runtime overhead that would otherwise occur in prior art systems that convert non-position-independent-code into position-independent-code for purposes of data sharing.

Live data that is subject to a paging operation is referred to as "paged live data" throughout this disclosure. Because the paged live data does not have to be re-generated during runtime of the subsequent application, the second application can be started much faster because it resumes execution at a later time point. In particular, the paged live data is live data of the second application at the later time point. The paged live data may include any relevant state information or the results of calculations or determinations that, when used as the current working data set of the second application, allow the second application to begin or resume execution at the later time point instead of an initial point corresponding to a null or newly initialized working data set when the second application is run without paging any live data. Optionally, in order to conserve volatile memory resources, only those portions of live data that are common to both the closed and subsequent applications may be paged into volatile memory. In some embodiments, shared live data is paged into volatile memory in an on-demand fashion such that portions of live data that are used earlier during runtime of the subsequent application are paged into volatile memory prior to portions of live data that are used later during runtime of the subsequent application.

It should be appreciated that after the paging operation, an original copy of the paged live data may remain stored in the non-volatile memory, and that a local copy of the paged live data is stored in the volatile memory. In some embodiments, the original copy of the paged live data in the non-volatile memory is identical to the local copy of the paged live data in the volatile memory immediately following the paging operation.

Depending on the configuration of the system/memory, a local copy of paged live data that is stored in volatile memory may or may not be capable of being modified during runtime of the subsequent application. In some embodiments, paged live data is shared between multiple subsequent applications during runtime of the respective subsequent applications. In such embodiments, a local copy of the paged live data stored in an original physical memory location may be modified using a copy on write (COW) operation such that the modification of an original page of live data triggers the provisioning of a new physical memory location in the volatile memory for storing the modified contents of the original page. In this way, the unmodified contents of the original page remain stored in the original physical memory location such that one application's modification of an original page does not inhibit the other applications from continuing to access the unmodified original page stored in the original physical memory location.

In some embodiments, an application may be run using simulated user inputs to train the managed runtime environment into generating desired live data. This is particularly useful to trigger the generation of desired JIT code for the frequently executed path. The application may then be closed, and the live data stored into non-volatile memory so that it is available to be paged in and used in conjunction with a subsequent application. In an embodiment, reusing paged live data to execute a subsequent application in the managed runtime environment may include using the paged live data to restore a new version of a closed application as the subsequent application. In such embodiments, the subsequent application may be restored using different environment variables than were used to run the closed application (prior to termination of the closed application) such that the subsequent application behaves differently than the closed application. For example, the subsequent application may execute different methods than the closed application by virtue of the subsequent application being restored using different environment variables than were used to run the closed application. These and other inventive aspects are described in greater detail below.

FIG. 1 is a diagram of a processing system 100 for processing applications. As shown, the processing system 100 includes hardware no, an operating system 120, an MRTE 130, and applications 140. The hardware no includes non-volatile memory 111, volatile memory 112, and central processing units (CPUs) 115. The volatile memory 112 may be any type of computer memory that requires the processing system 100 to remain powered in order to maintain stored information, including (but not limited to) random access memory. The non-volatile memory 111 may be any type of computer memory that does not require the processing system 100 to remain powered in order to maintain stored information such that information that was stored in the non-volatile memory 111 prior to powering-down of the computing system 100 may be retrieved subsequent to a subsequent re-powering/powering-up of the computing system 100. The CPUs 112 may be any electrical component, or collection of electrical components, that is/are configured to perform operations according to instructions associated with one or more of the applications 140 that are being processed by the processing system 100. As used herein, an instruction is deemed to be "associated with" an application if the instruction is either specified in source code of the application or otherwise generated as a result of compiling the application into bytecode, and interpreting/compiling bytecode instructions into native instructions.

The operating system 120 may be any software that manages hardware 110 and/or software resources of the processing system when one or more of the applications 140 are being processed by the processing system 100. The operating system 120 may also provide common services to, and schedule tasks for, applications 140 that are being processed by the processing system 100.

The MRTE 130 may be any virtual machine, or collection of virtual machines, that is/are installed on the operating system for the purpose of running a managed application. By way of example, the MRTE 130 may be a Java virtual machine. The MRTE 130 includes an interpreter 132 and a just-in-time (JIT) compiler 134. The interpreter 132 may be software that interprets bytecode. The JIT compiler 134 may be software that converts bytecode into native machine instructions. It should be appreciated that the MRTE 130 may include additional components as well, such as different classloaders for loading class files storing bytecode for different classes, a garbage collector that is responsible for sweeping through the Java heap and collecting non-reachable objects, as well as other components The applications 140 may be any program that includes managed code (e.g. Java source code), including hybrid applications that include both managed code and unmanaged code (e.g. C code such as JNI code). By way of example, the applications 140 may include a file containing java source code.

Figure 2:
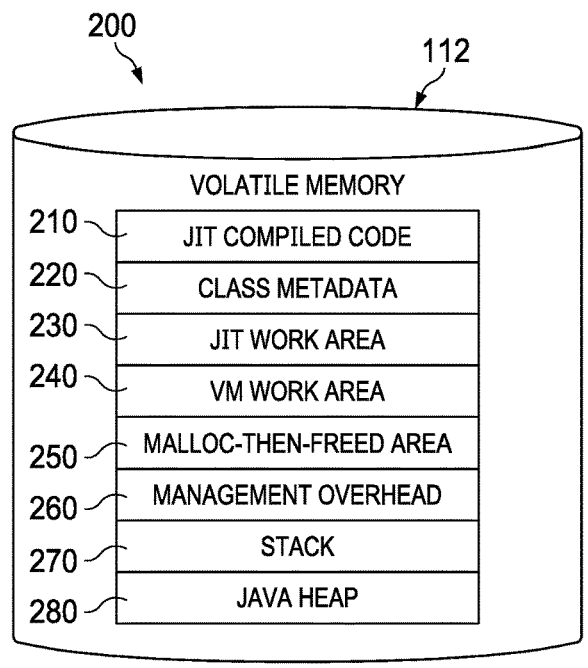
FIG. 2 is a diagram of types of live data stored in memory.

Live data is generated and stored into the volatile memory 112 as a result of running one of the applications 140 in the MRTE 130. FIG. 2 is a diagram of live data 200 that is stored in the volatile memory 112 as the result of running one of the applications 140 in the MRTE 130. As shown, the live data 200 includes JIT compiled code 210, and class metadata 220, as well as data stored in a JIT work area 230, data stored in a virtual machine (VM) work area 240, data stored in a Malloc-then-freed area 250, data stored qualifying as management overhead 260, data stored in a stack 270, and data stored in a Java heap 280 area.

The JIT compiled code 210 contains native instructions generated by the JIT compiler 134. The class metadata 220 may generally include any data structure describing classes in memory maintained by a virtual machine during program execution, including (but not limited to bytecode, class descriptors, methods, and constant pools. The JIT work area 230 is a work area for a JIT compiler, and includes data (e.g., data structures, etc.) used by the JIT compiler for generating the JIT compiled code 210. The VM work area 240 includes data used by the virtual machine (e.g., the JVM, etc.) itself as well as memory allocated by a Java class library or user-defined native interface methods (e.g., Java native interface (JNI) methods, etc.). The Malloc-then-freed area 250 includes data stored in memory that was allocated by a malloc( ) function, and then free( )ed, but still resides in free list memory or the like. The management overhead 260 includes data corresponding to an unused portion of a partially used page, or data used to manage an artifact, such as the malloc header. The stack 270 may include data corresponding to a C stack or Java Stack. The java heap 280 may include application allocated objects.

Figure 3:
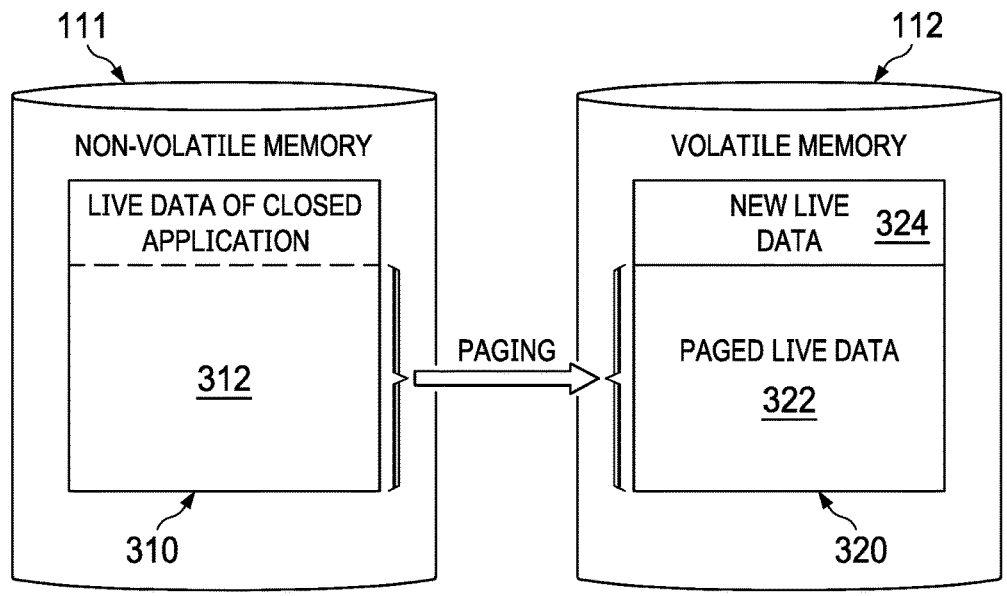
FIG. 3 is a diagram showing how live data of a closed application is paged from non-volatile memory to volatile memory so that the paged live data may be re-used when running a subsequent application.

Aspects of this disclosure significantly increase the amount of live data that can be shared between a closed application and a subsequent application by storing live data of a closed application during runtime of the closed application, and thereafter paging a portion of the live data that is common to both the closed application and the subsequent application back into volatile memory at the same virtual memory address in which the portion of live data was stored during runtime of the closed application so that the paged lived data may be re-used to execute the subsequent application in the managed runtime environment. FIG. 3 is a diagram showing how live data of a closed application is paged from non-volatile memory to volatile memory so that the paged live data may be re-used when running a subsequent application. As shown, live data 310 of the closed application is stored in non-volatile memory 111 upon termination of the closed application. Thereafter, a portion of the live data 310 is paged from the non-volatile memory 111 back into the volatile memory 116 back at the same virtual memory address of the volatile memory 116 in which the portion of live data was stored during runtime of the closed application. It should be appreciated that after the paging operation, an original copy the paged live data 312 remains stored in the non-volatile memory 311, and that a local copy of the paged live data 322 is stored in the volatile memory 311. Although the paged live data 322 is depicted as being contiguous in FIG. 3 for ease of illustration, it should be appreciated that the paged live data 322 may in-fact be non-contiguous such that the paged live data 322 includes pages that are mapped to non-consecutive virtual memory addresses in the volatile memory 116.

The original copy of the paged live data 312 may be identical to the local copy of the paged live data 322 when the local copy of the paged live data 322 is initially stored in the volatile memory 112. After the initial paging operation, the local copy of the paged live data 322 may or may not be modified during the runtime of the subsequent application depending on a configuration of the corresponding virtual memory addresses.

New live data 324 may be generated during runtime of the subsequent application, and the new live data 324 and the local copy of the paged live data 322 may together form live data 320 of the subsequent application. As discussed above, live data, and by extension paged lived data, may include native instructions, bytecode, class metadata, and various other types of data. In an embodiment, the paged live data 322 includes one or more native instructions corresponding to the closed application, and the paged native instructions are used to execute the subsequent application. The paged native instruction(s) may include position-independent-code that is not required to be mapped to a specific virtual memory address, position dependent code that is required to be mapped to a specific virtual memory address, or a combination thereof. In another embodiment, the paged live data 322 includes class metadata corresponding to a closed application, and the paged class metadata is used to execute the subsequent application during runtime of the subsequent application. In yet another embodiment, the paged live data 322 includes data associated with, or stored in, one or more of a virtual machine work-area of the closed application, a compiler work-area of the closed application, a malloc-then-freed area of the closed application, management overhead area of the closed application, a stack area of the closed application, and/or a Java heap area of the closed application, and the paged data is used to execute the subsequent application during runtime of the subsequent application.

Figure 4:
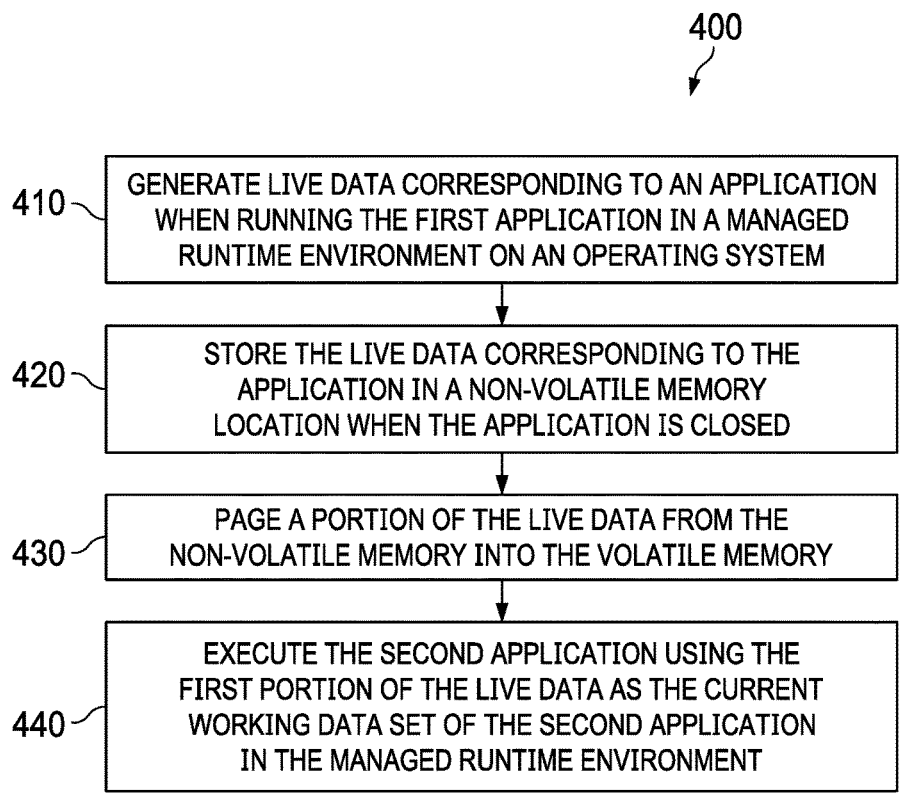
FIG. 4 is a flowchart of a method for reusing live data of a closed application to execute a subsequent application.

FIG. 4 is a flowchart of a method 400 for reusing live data of a closed application to execute a subsequent application, as may be performed by a managed runtime environment. At step 410, the managed runtime environment generates live data corresponding to an application when running the application. At step 420, the MRTE stores the live data in non-volatile memory after the application is closed. At step 430, the MRTE pages at least a portion of the live data from the non-volatile memory into the volatile memory. At step 440, the MRTE executes the second application using the first portion of the live data as the current working data set of the second application in the managed runtime environment. The closed application was terminated prior to reusing the portion of live data corresponding to the closed application to execute the subsequent application.

Figure 5:
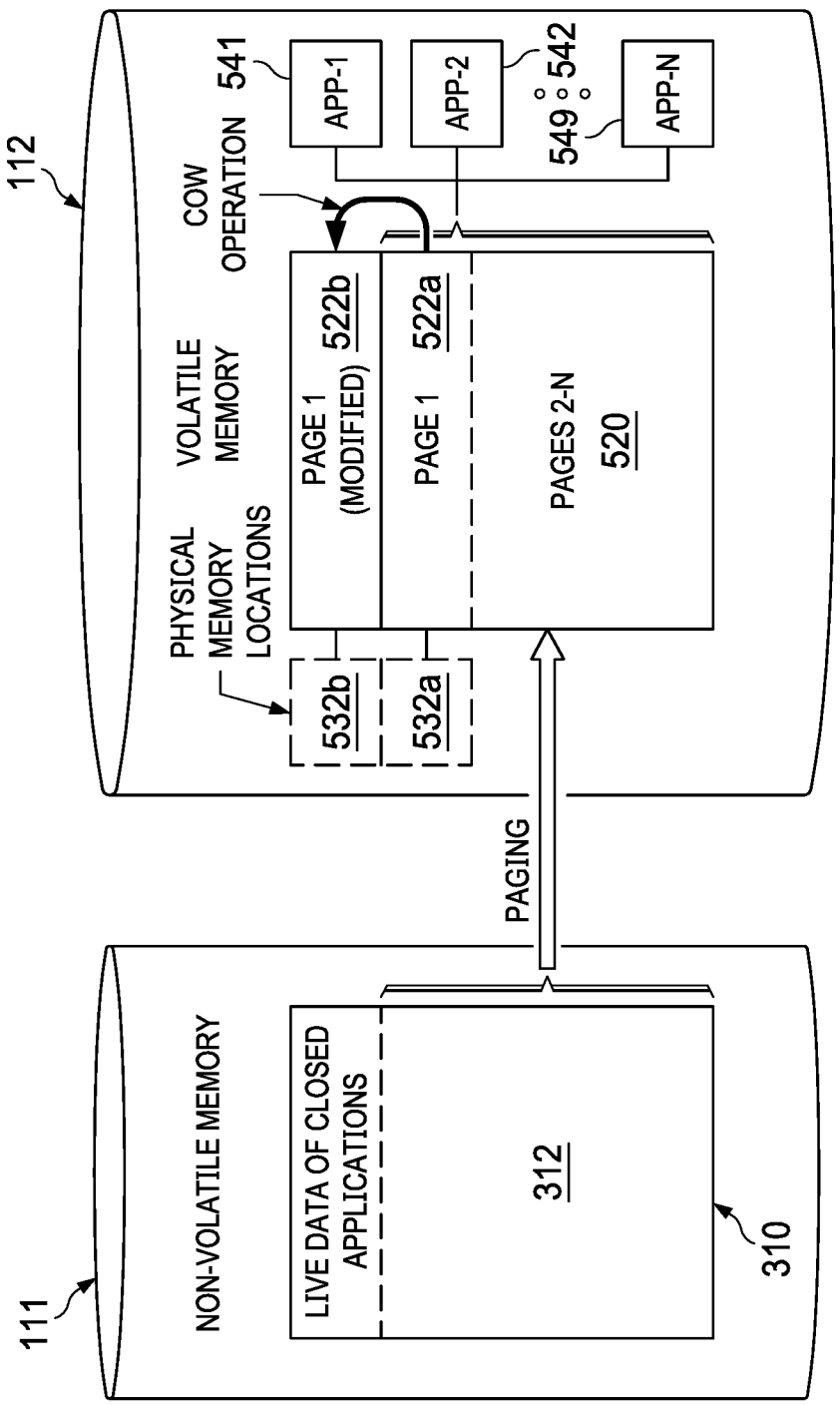
FIG. 5 is a diagram showing how live data in volatile memory is modified using a COW operation.

In some embodiments, paged live data that is stored in volatile memory is available for executing multiple subsequent applications. In such embodiments, the paged live data may be modified using a copy on write (COW) operation such that a modification to the contents of an original page triggers the provisioning of a new page, in the volatile memory, for storing the modified contents of the original page. In this way, the unmodified content of the original page remains stored as the original page in the volatile memory location so that it is available to the other applications. FIG. 5 is a diagram showing how live data in volatile memory is modified using a COW operation. As shown, a portion of live data from a closed operation is paged from the non-volatile memory 111 into the volatile memory 112, where it is available for executing the applications 541-549. The In this example, a page 522a in the local copy of the paged data 520 is paged into physical memory location 532a, which is associated with the same virtual memory address in which page 522a was stored during runtime of the closed application. The page 522a is subsequently modified by the application 541 in accordance with a COW operation during runtime of the application 542 in the managed runtime environment. Because the modification is made using the COW operation, the modification triggers the provisioning of a new physical memory location 532b in the volatile memory 112, and the modified contents of page 522a are stored as new page 522b in the new physical memory location 532b of the volatile memory 112. In this way, the original/unmodified contents of page 522a remain stored as page 522a in the original physical memory location 532a of the volatile memory 112 so that original page 522a remains available for executing the subsequent applications 542-549. The new physical memory location 532b may be a private/privileged physical memory location in the volatile memory 112, such that the new page 522b is accessible to the subsequent application 541, but not accessible to the subsequent applications 542-549. It should be appreciated that the subsequent application 541 may associate the physical memory location 532b with the same virtual memory address in which the subsequent application 542 associates the physical memory location 532a. In this way, the same virtual memory address can be associated with different physical memory locations by different applications following a COW operation.

In one embodiment, one or more pages in the paged data are common to both the application 541 and the application 542 such that the one or more pages are reused to execute both of the applications 541, 542. In such an embodiment, if the application 541 and the application 542 are restored inside different non-privileged containers, then the one or more pages may be shared across the respective non-privileged containers.

Figure 6:
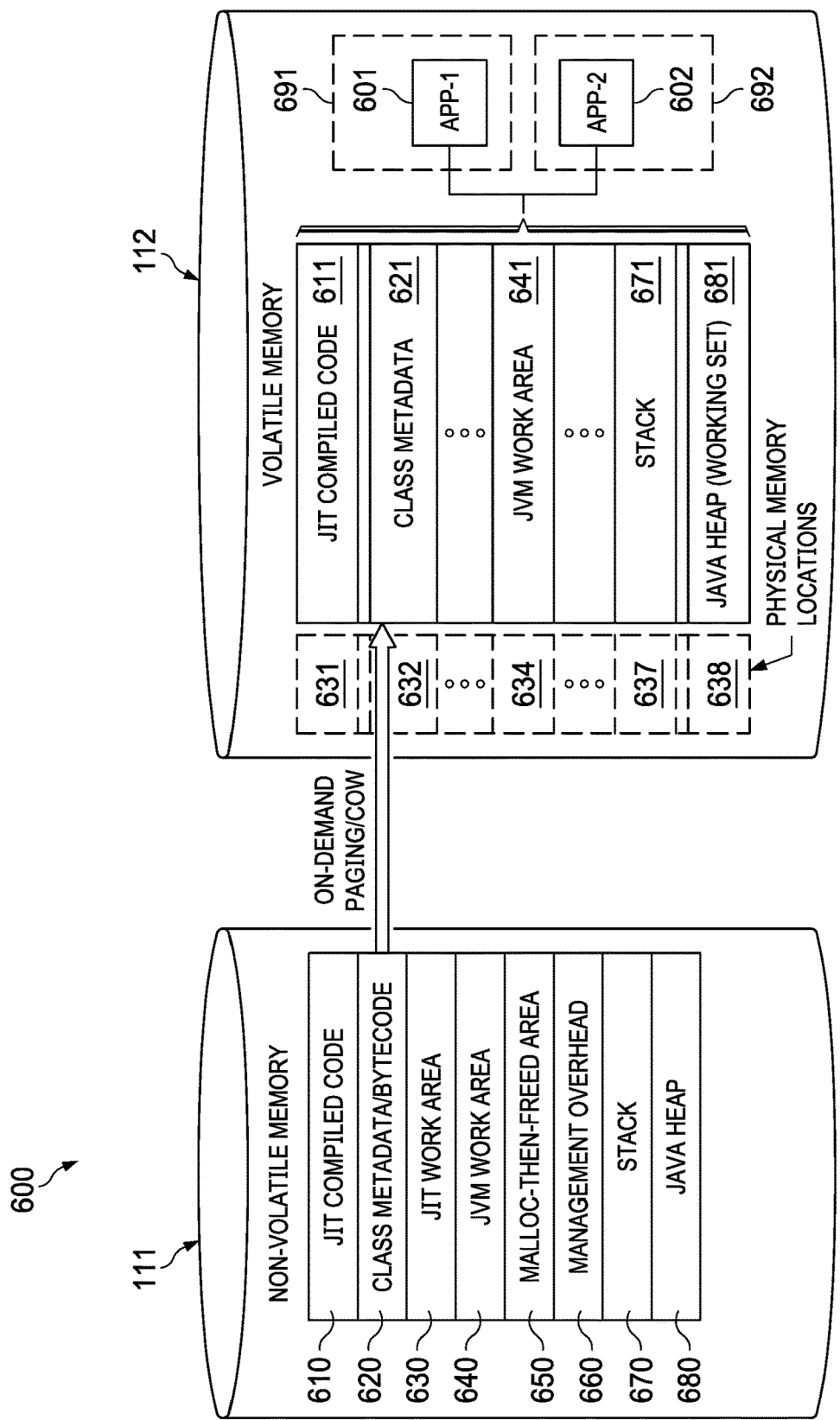
FIG. 6 is a diagram showing how live data of a closed application is paged from non-volatile memory to volatile memory, and then shared across non-privileged containers in order to restore different subsequent applications in the respective non-privileged containers.

In some embodiments, live data is paged from non-volatile memory into volatile memory, and then shared across non-privileged containers associated with different subsequent applications. FIG. 6 is a diagram showing how live data of a closed application is paged from non-volatile memory to volatile memory, and then shared across non-privileged containers in order to restore different subsequent applications in the respective non-privileged containers.

As shown, live data 601 associated with a closed application is stored in non-volatile memory 111. In this example, the live data 601 includes JIT compiled code 610, class metadata 620, data stored in a JIT work area 630, data stored in a virtual machine (VM) work area 640, data stored in a Malloc-then-freed work area 650, data classified as management overhead 660, data stored in a stack 670, and data stored in a java heap 680. The various live data types in the live data 600 are similar to the corresponding live data types in the live data 200 depicted in FIG. 2. As shown, various portions of the JIT compiled code 610, class metadata 620, data stored in the VM work area 640, data stored in the stack 670, and data stored in the java heap 680 are paged from the non-volatile memory 111 into the volatile memory 112, and stored as paged JIT compiled code 611 in physical memory location 631, paged class metadata 621 in physical memory location 632, paged VM work area data 641 in physical memory location 634, paged stack data 671 in physical memory location 637, and paged java heap data 681 in physical memory location 638, in non-privileged container 691 of the volatile memory 112.

The paged JIT compiled code 611, paged class metadata 621, paged VM work area data 641, paged stack data 671, and paged java heap data 681 are then used to restore application 601 in non-privileged container 691 as well as to restore application 602 in non-privileged container 692. In this way, the paged live data is shared across the non-privileged containers 691, 692.

Figure 7:
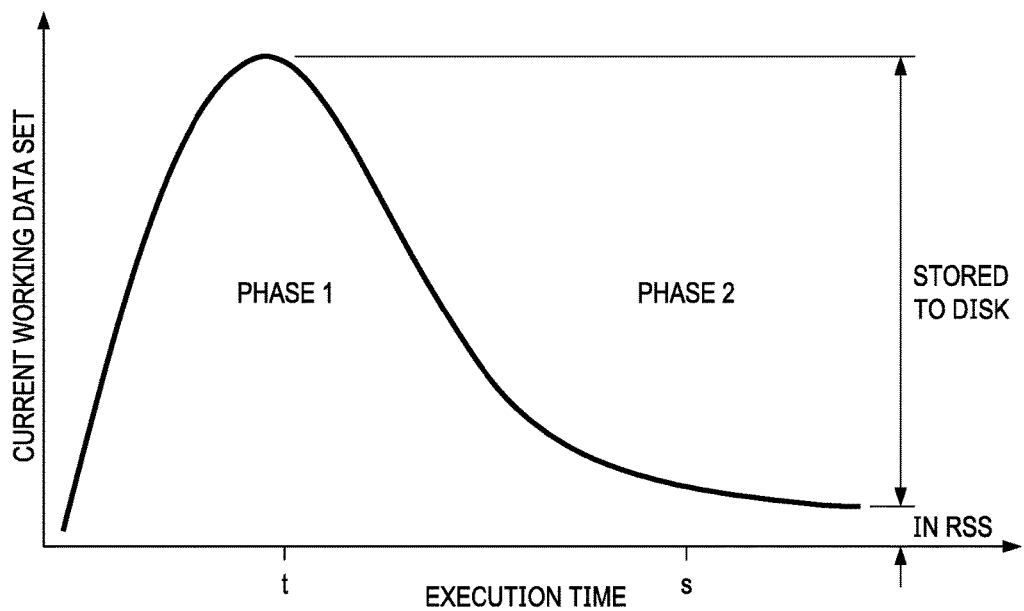
FIG. 7 is a graph of live data being generated during runtime of an application.

FIG. 7 is a graph of live data generated during runtime of an application. Until approximately time t, new live data is generated during runtime of the application, and stored as a live data set in anonymous regions of volatile memory. In conventional MRTEs, the live data is not backed up in non-volatile memory such that once the live data set is dropped from volatile memory, there is no way to recover the live data. However, in embodiments of this disclosure, live data is stored in non-volatile memory such that a snapshot of the live data is transferred into non-volatile memory at time s, and the application is closed at some point after time s. Thereafter, a subsequent application is restored by paging a portion of the live data corresponding to the closed application back into volatile memory, and using the paged live data to execute the subsequent application.

Advantageously, much of the live data that is present during time t is only needed for initialization, and is therefore not actively needed during time s, when the snapshot of the live data is transferred into non-volatile memory. As a result, only the live data required to restore the subsequent application is paged back into volatile memory at time s, which significantly reduces the amount of live data that is stored in volatile memory during runtime of the subsequent application.

Figure 8:
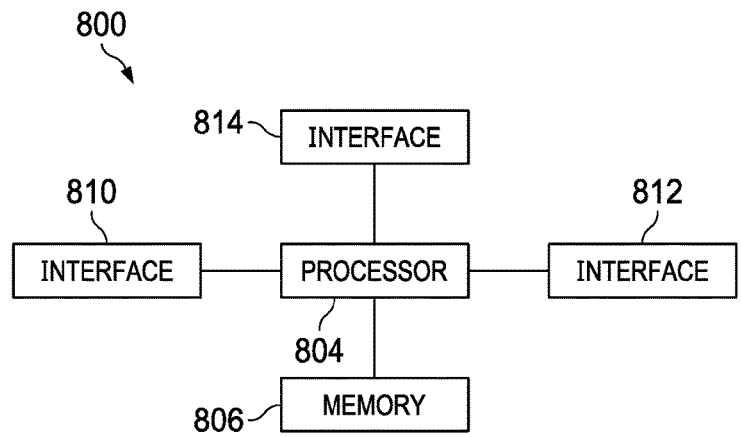
FIG. 8 is a diagram of an embodiment processing system.

FIG. 8 is a block diagram of an embodiment processing system 800 for performing methods described herein, which may be installed in a host device. As shown, the processing system 800 includes a processor 804, a memory 806, and interfaces 810-814, which may (or may not) be arranged as shown in FIG. 8. The processor 804 may be any component or collection of components adapted to perform computations and/or other processing related tasks, and the memory 806 may be any component or collection of components adapted to store programming and/or instructions for execution by the processor 804. A means for configuring a context may include processor 804. In an embodiment, the memory 806 includes a non-transitory computer readable medium storing programming for execution by a processor. The interfaces 810, 812, 814 may be any component or collection of components that allow the processing system 800 to communicate with other devices/components and/or a user.

For example, one or more of the interfaces 810, 812, 814 may be adapted to communicate data, control, or management messages from the processor 804 to applications installed on the host device and/or a remote device. As another example, one or more of the interfaces 810, 812, 814 may be adapted to allow a user or user device (e.g., personal computer (PC), etc.) to interact/communicate with the processing system 800. The processing system 800 may include additional components not depicted in FIG. 8, such as long term storage (e.g., non-volatile memory, etc.).

Figure 9:
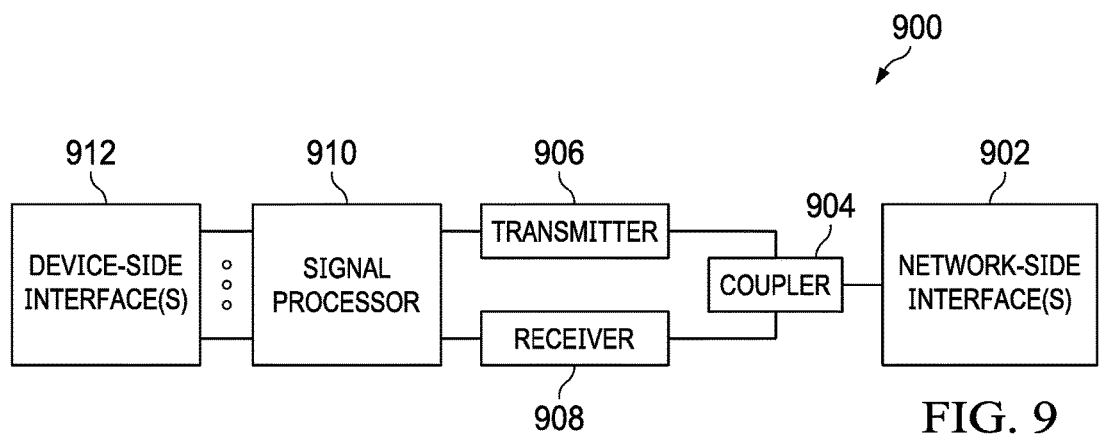
FIG. 9 is a diagram of an embodiment transceiver.

In some embodiments, one or more of the interfaces 810, 812, 814 connects the processing system 800 to a transceiver adapted to transmit and receive signaling over the telecommunications network. FIG. 9 is a block diagram of a transceiver 900 adapted to transmit and receive signaling over a telecommunications network. The transceiver 900 may be installed in a host device. As shown, the transceiver 900 comprises a network-side interface 902, a coupler 904, a transmitter 906, a receiver 908, a signal processor 910, and a device-side interface 912. The network-side interface 902 may include any component or collection of components adapted to transmit or receive signaling over a wireless or wireline telecommunications network. The network-side interface 902 may also include any component or collection of components adapted to transmit or receive signaling over a short-range interface. The network-side interface 902 may also include any component or collection of components adapted to transmit or receive signaling. The coupler 904 may include any component or collection of components adapted to facilitate bi-directional communication over the network-side interface 902. The transmitter 906 may include any component or collection of components (e.g., up-converter, power amplifier, etc.) adapted to convert a baseband signal into a modulated carrier signal suitable for transmission over the network-side interface 902. A means for transmitting an initial message of an access procedure may include transmitter 906. The receiver 908 may include any component or collection of components (e.g., down-converter, low noise amplifier, etc.) adapted to convert a carrier signal received over the network-side interface 902 into a baseband signal. A means for receiving mobile subscriber identifiers, initial downlink messages of access procedures, and forwarded requests to connect to a network may include receiver 908.

The signal processor 910 may include any component or collection of components adapted to convert a baseband signal into a data signal suitable for communication over the device-side interface(s) 912, or vice-versa. The device-side interface(s) 912 may include any component or collection of components adapted to communicate data-signals between the signal processor 910 and components within the host device (e.g., the processing system 1200, local area network (LAN) ports, etc.).

The transceiver 900 may transmit and receive signaling over any type of communications medium. In some embodiments, the transceiver 900 transmits and receives signaling over a wireless medium. Specific processing systems and/or transceivers may utilize all of the components shown, or only a subset of the components, and levels of integration may vary from device to device.

It should be appreciated that embodiment methods described herein may be embodied in a computer program product comprising a non-transitory computer readable storage medium storing programming that includes instructions to perform the steps of the underlying method.

Although embodiments have been described with reference to illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A method comprising:
generating live data corresponding to a first managed runtime application during runtime of the first managed runtime application in a managed runtime environment of an operating system and storing the live data in volatile memory;
storing the live data, that was stored in the volatile memory, into non-volatile memory;
closing the first managed runtime application after storing the live data, that was stored in the volatile memory, into the non-volatile memory and prior to executing a second managed runtime application in the managed runtime environment;
paging a first portion of the live data from the non-volatile memory into the volatile memory, the first portion of the live data being common to both a current working data set of the first managed runtime application and a current working data set of the second managed runtime application; and
executing the second managed runtime application in the managed runtime environment using the first portion of the live data in the current working data set of the second managed runtime application after paging the first portion of the live data from the non-volatile memory into the volatile memory.

2. The method of claim 1, wherein paging the first portion of live data comprises paging the first portion of live data at a first virtual memory address, the first virtual memory address being the same virtual memory address in which the first portion of live data was stored during runtime of the first managed runtime application.

3. The method of claim 2, wherein the first portion of live data that is paged into the volatile memory includes native instructions common to both the first managed runtime application and the second managed runtime application.

4. The method of claim 3, wherein the native instructions are just-in-time compiled (JIT-compiled) code generated by a just-in-time compiler in the managed runtime environment.

5. The method of claim 3, wherein at least some of the native instructions are position-independent-code that is not required to be mapped to a specific virtual memory address.

6. The method of claim 3, wherein at least some of the native instructions are non-position-independent-code that is required to be mapped to a specific virtual memory address.

7. The method of claim 3, wherein executing the second managed runtime application using the first portion of the live data in the current working data set of the second managed runtime application in the managed runtime environment comprises:
reusing the paged native instructions to execute the second managed runtime application.

8. The method of claim 3, wherein fewer than all native instructions of the first managed runtime application are paged from the non-volatile memory to the volatile memory.

9. The method of claim 1, wherein generating the live data comprises:
running the first managed runtime application with simulated user inputs to train the managed runtime environment such that the live data is generated.

10. The method of claim 1, wherein executing the second managed runtime application using the first portion of the live data in the current working data set of the second managed runtime application in the managed runtime environment comprises:
restoring the second managed runtime application according to at least the first portion of live data corresponding to the first managed runtime application.

11. The method of claim 10, wherein restoring the second managed runtime application comprises restoring the second managed runtime application using at least some environmental variable are different than at least some of the environment variables that were used to run the first managed runtime application, and wherein the second managed runtime application has a process identifier (ID).

12. The method of claim 1, wherein the first portion of live data that is paged into the volatile memory includes just-in-time compiled machine instructions associated with the first managed runtime application.

13. The method of claim 12, wherein executing the second managed runtime application using the first portion of the live data in the current working data set of the second managed runtime application in the managed runtime environment comprises:
reusing the paged just-in-time compiled machine instructions to execute the second managed runtime application.

14. The method of claim 1, wherein paging the first portion of live data from the non-volatile memory into volatile memory comprises:
paging the first portion of live data and a second portion of the live data from the non-volatile memory to a volatile memory in an on-demand fashion such that the first portion of live data is paged into the volatile memory prior to the second portion of live data, the first portion of live data being used prior to the second portion of live data during runtime of the second managed runtime application.

15. The method of claim 14, wherein paging the first portion of live data comprises paging the first portion of live data at a first virtual memory address, the first virtual memory address being the same virtual memory address in which the first portion of live data was stored during runtime of the first managed runtime application.

16. The method of claim 1, wherein the first portion of live data that is paged into the volatile memory includes class metadata of the first managed runtime application.

17. The method of claim 16, wherein the class metadata includes at least one of a class descriptor, method, constant pool, task table, Java class, or any data structure describing classes in memory maintained by a Java virtual machine (JVM) during program execution.

18. The method of claim 16, wherein executing the second managed runtime application using the first portion of the live data in the current working data set of the second managed runtime application in the managed runtime environment comprises:
reusing the paged class metadata of the first managed runtime application to execute the second managed runtime application.

19. The method of claim 18, wherein less than all of the class metadata of the first managed runtime application is paged from the non-volatile memory to the volatile memory.

20. The method of claim 1, wherein the first portion of live data that is paged into the volatile memory includes data associated with at least one of a virtual machine work-area of the first managed runtime application, a just in time (JIT)

compiler work-area of the first managed runtime application, JIT code, a malloc-then-freed area of the first managed runtime application, a management overhead area of the first managed runtime application, a stack area of the first managed runtime application, and a Java heap area of the first managed runtime application.

21. The method of claim 20, wherein the first portion of live data that is paged into the volatile memory includes data associated with the virtual machine work-area of the first managed runtime application and wherein executing the second managed runtime application using the first portion of the live data in the current working data set of the second managed runtime application in the managed runtime environment comprises:
  reusing the data associated with the virtual machine work-area to execute the second managed runtime application.

22. The method of claim 20, wherein the first portion of live data that is paged into the volatile memory includes data associated with the Java heap area of the first managed runtime application and wherein executing the second managed runtime application using the first portion of the live data in the current working data set of the second managed runtime application in the managed runtime environment comprises:
  reusing the data associated with the Java heap area to execute the second managed runtime application.

23. The method of claim 20, wherein the first portion of live data that is paged into the volatile memory includes data associated with the stack area of the first managed runtime application and wherein executing the second managed runtime application using the first portion of the live data in the current working data set of the second managed runtime application in the managed runtime environment comprises:
  reusing the data associated with the stack area to execute the second managed runtime application.

24. The method of claim 20, wherein the first portion of live data that is paged into the volatile memory includes data associated with the JIT compiler work-area of the first managed runtime application and wherein executing the second managed runtime application using the first portion of the live data in the current working data set of the second managed runtime application in the managed runtime environment comprises:
  reusing the data associated with the JIT compiler work-area to compile bytecode of the second managed runtime application.

25. The method of claim 1, wherein the first portion of live data includes a first page stored in a first physical memory location that is available to both the second managed runtime application and a third application, and wherein the method further comprises:
  executing the third application using the first page in the current working data set of the third application in the managed runtime environment.

26. The method of claim 25, wherein executing the second managed runtime application using the first portion of the live data in the current working data set of the second managed runtime application in the managed runtime environment comprises:
  modifying content of the first page in the volatile memory during execution of the second managed runtime application according to a copy on write (COW) operation during runtime of the third application, wherein modifying the content of the first page according to the COW operation comprises provisioning a second physical memory location in the volatile memory, and storing the modified content as a second page in the second physical memory location of the volatile memory, the original content of the first page remaining stored as the first page at the first physical memory location of the volatile memory such that the original content of the first page remains available for executing the third application in the managed runtime environment.

27. The method of claim 25, wherein the first page of live data includes native instructions common to both the second managed runtime application and the third application.

28. The method of claim 27, wherein at least some of the native instructions are non-position-independent-code that is required to be mapped to a specific virtual memory address.

29. The method of claim 1, wherein the first portion of live data that is paged into the volatile memory includes at least a first page that is stored in a physical memory location of the volatile memory, the first page stored in the physical memory location being available to both the second managed runtime application and a third application, and wherein executing the second managed runtime application using the first portion of the live data in the current working data set of the second managed runtime application in the managed runtime environment comprises:
  re-using at least the first page stored in the physical memory location of the volatile memory to execute at least the second managed runtime application and the third application in the managed runtime environment, the first page being common to each of the first managed runtime application, the second managed runtime application, and the third application.

30. The method claim 29, wherein the second managed runtime application and the third application are restored inside different non-privileged containers, and wherein the first page is shared across the respective non-privileged containers.

31. An apparatus comprising:
  a processor; and
  a non-transitory computer readable storage medium storing programming for execution by the processor, the programming including instructions to:
    generate live data corresponding to a first managed runtime application during runtime of the first managed runtime application in a managed runtime environment of an operating system and storing the live data in volatile memory;
    store the live data, that was stored in the volatile memory, into non-volatile memory;
    close the first managed runtime application after storing the live data stored in the non-volatile memory and prior to executing a second managed runtime application in the managed runtime environment;
    page a first portion of the live data from the non-volatile memory into the volatile memory, the first portion of the live data being common to both a current working data set of the first managed runtime application and a current working data set of the second managed runtime application; and
    execute the second managed runtime application in the managed runtime environment using the first portion of the live data in the current working data set of the second managed runtime application after paging the first portion of the live data from the non-volatile memory into the volatile memory.

32. A computer program product comprising a non-transitory computer readable storage medium storing programming, the programming including instructions to:

generate live data corresponding to a first managed runtime application during runtime of the first managed runtime application in a managed runtime environment of an operating system and storing the live data in volatile memory;
store the live data, that was stored in the volatile memory, into non-volatile memory;
close the first managed runtime application after storing the live data stored in the non-volatile memory and prior to executing a second managed runtime application in the managed runtime environment;
page a first portion of the live data from the non-volatile memory into the volatile memory, the first portion of the live data being common to both a current working data set of the first managed runtime application and a current working data set of the second managed runtime application; and
execute the second managed runtime application in the managed runtime environment using the first portion of the live data in the current working data set of the second managed runtime application after paging the first portion of the live data from the non-volatile memory into the volatile memory.

* * * * *